US009676067B2

(12) United States Patent
Ryu (10) Patent No.: US 9,676,067 B2
(45) Date of Patent: Jun. 13, 2017

(54) SPOT WELDING APPARATUS (71) Applicant: Hyundai Motor Company, Seoul (KR)

(72) Inventor: Sung Phil Ryu, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 421 days.

(21) Appl. No.: 14/144,454

(22) Filed: Dec. 30, 2013

(65) Prior Publication Data

US 2014/0299583 A1     Oct. 9, 2014

(30) Foreign Application Priority Data

Apr. 3, 2013  (KR) .................. 10-2013-0036501

(51) Int. Cl.
- *B23K 37/02* (2006.01)
- *B23K 11/11* (2006.01)
- *B23K 11/31* (2006.01)

(52) U.S. Cl.
CPC ........ *B23K 37/0258* (2013.01); *B23K 11/115* (2013.01); *B23K 11/315* (2013.01); *B23K 37/0282* (2013.01)

(58) Field of Classification Search
CPC .............. B23K 37/0258; B23K 11/315; B23K 37/0282; B23K 11/115
USPC ....................... 219/86.33, 86.7, 87
See application file for complete search history.

(56) References Cited

U.S. PATENT DOCUMENTS

| | | | |
|---|---|---|---|
| 2005/0184031 A1* | 8/2005 | Sun ...................... | B23K 11/002 219/117.1 |
| 2007/0175868 A1* | 8/2007 | Christensen ....... | B23K 11/3081 219/86.25 |
| 2012/0125974 A1* | 5/2012 | Kwon ..................... | B23K 11/11 228/8 |
| 2012/0241416 A1* | 9/2012 | Sakamoto ............. | B23K 11/115 219/91.2 |
| 2013/0037528 A1* | 2/2013 | Ogake ................ | B23K 11/0033 219/127 |

FOREIGN PATENT DOCUMENTS

| | | | | |
|---|---|---|---|---|
| JP | 2002160077 | A | * | 6/2002 |
| KR | 10-2012-0051557 | A | | 5/2012 |
| KR | 20120051557 | A | * | 5/2012 |

* cited by examiner

*Primary Examiner* — David Angwin
*Assistant Examiner* — Biniam Asmelash
(74) *Attorney, Agent, or Firm* — Morgan Lewis & Bockius LLP (57) ABSTRACT

A spot welding apparatus may include a fixed welding machine coupled to a fixing frame having a mounting portion mounted on an arm of a robot, a guide plate mounted on the fixing frame, one or more moving welding machines mounted to be selectively and slidingly movable along a longitudinal direction of the guide plate, and an operating unit configured to selectively move the moving welding machine.

7 Claims, 5 Drawing Sheets

SPOT WELDING APPARATUS

CROSS-REFERENCE TO RELATED APPLICATION

The present application claims priority of Korean Patent Application Number 10-2013-0036501 filed on Apr. 3, 2013, the entire contents of which application are incorporated herein for all purposes by this reference.

BACKGROUND OF INVENTION

Field of Invention

The present invention relates to a spot welding apparatus, and more particularly, to a spot welding apparatus which allows welding to be performed at a plurality of welding points, and simultaneously allows welding to be performed while varying a welding pitch in accordance with a distance between the respective welding points, thereby quickly performing welding work in a limited space for a minimum period of time.

Description of Related Art

In general, in a process of manufacturing a vehicle, an integral vehicle body is completed by bonding various structural components such as vehicle body panels, which are formed by a press, by a welding method, or the like. In a painting process, painting work, and rust prevention work are performed on a surface of each of the components of the completed vehicle body, and thereafter components of a power train system and components of suspension, steering, and brake systems are assembled. Next, a design process of assembling doors, a trunk lid, a hood, or the like is performed.

In addition, in a vehicle body assembly process for a vehicle, in order to bond components of the vehicle body such as a roof, pillars, side panels, opening part flanges of vehicle body doors, a spot resistance welding method is widely used as a method of bonding two sheets of vehicle body panels.

Figure 1:
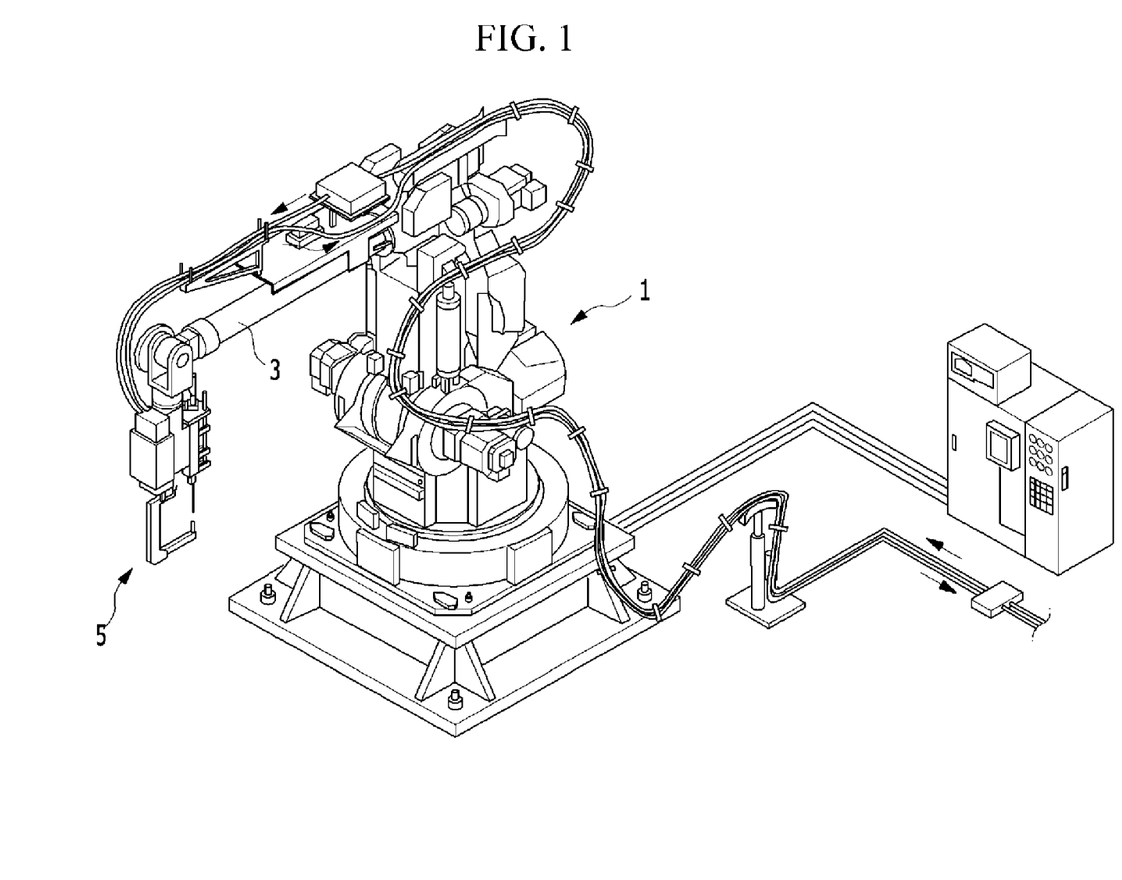
FIG. 1 is a perspective view of a general spot welding robot system.

The spot resistance welding method refers to a method of welding the vehicle body panels using electrical resistance while applying pressure to surfaces of the vehicle body panels. Referring to FIG. 1, the spot resistance welding method is typically performed by a C-type spot welding gun 5 that is installed on a front end of an arm 3 of a robot 1 for spot welding.

Figure 2:
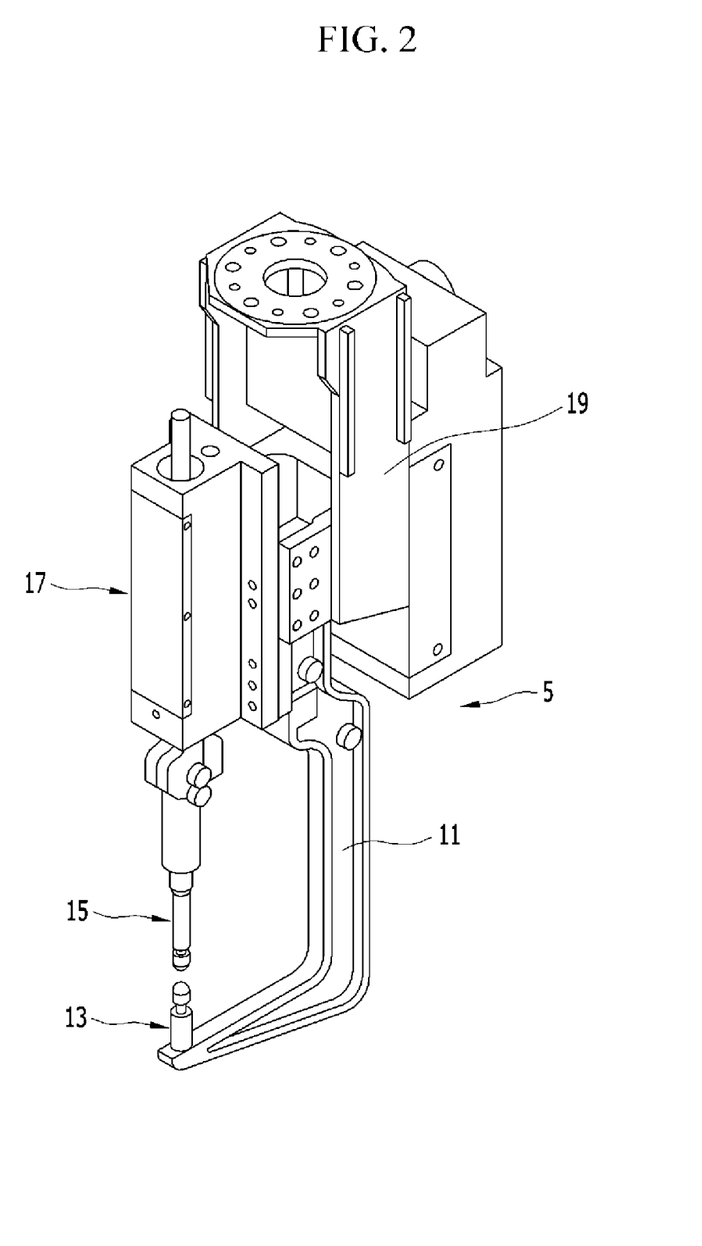
FIG. 2 is a perspective view of a general spot welding gun.

Referring to FIG. 2, the spot welding gun 5 has a lower electrode 13 and an upper electrode 15, which are coupled to a C-type gun body 11, and the upper electrode 13 is connected to a drive cylinder 17 that is installed at one side of an upper portion of the gun body 11 and provides pressure.

In a state in which the gun body 11 is installed on the front end of the arm 3 of the robot 1 through an installation frame 19, the spot welding gun 5 is positioned at a welding position in accordance with behavior of the robot 1 and performs the spot welding for an object to be welded by an operation of the drive cylinder 17.

Meanwhile, in the spot welding process for assembling the vehicle body, since continuous welding needs to be performed along typically tens to hundreds of positions of welding points, a long period of time is needed, and the work processes are very complicated. Therefore, various methods are being sought to shorten a welding time and improve productivity, efficiency, and welding quality.

However, in a general welding system, because one welding apparatus 5 can be attached to the robot arm 3 of one robot 1, and the welding can be performed for only one spot for every moment when the arm 3 of the robot moves, a very long period of time is needed to perform the welding for a predetermined number of welding points, and thereby there is a problem in that productivity and efficiency deteriorate.

To avoid the aforementioned problem, a plurality of robots can be installed and can simultaneously perform the welding while being moved along the positions of the welding points, but if a plurality of robots, which is expensive, has a complicated configuration, and requires a complicated control process, is used, there are problems in that costs for equipment and maintenance are increased, excessive energy is used, and a spatial occupancy rate of the robot is increased in a mass-production line.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a spot welding apparatus which allows welding to be performed at a plurality of welding points, and simultaneously allows welding to be performed while varying a welding pitch in accordance with a distance between the respective welding points, thereby quickly performing welding work in a limited space for a minimum period of time.

In addition, the present invention has been made in an effort to provide a spot welding apparatus which improves productivity, flexibility, and efficiency of a vehicle body process, reduces installation costs by applying a single apparatus and by reducing the number of robots, and reduces energy consumption.

Various aspects of the present invention provide a spot welding apparatus including: a fixed welding machine coupled to a fixing frame having a mounting portion mounted on an arm of a robot; a guide plate mounted on the fixing frame; one or more moving welding machines mounted to be selectively and slidingly movable along a longitudinal direction of the guide plate; and an operating unit configured to selectively move the moving welding machine.

The operating unit may include: a transfer cylinder mounted at one side of any one moving welding machine of the one or more moving welding machines; an operating rod which penetrates the fixing frame, is slidably connected to the moving welding machine, and selectively and slidingly moves the moving welding machine by an operation of the transfer cylinder; and a guide means provided between the guide plate and each of the moving welding machines so as to guide a movement of each of the moving welding machines.

The fixed welding machine may include: a first pressing actuator mounted on the fixing frame through which the operating rod penetrates; a first moving block configured to be able to reciprocate at a screw shaft of the first pressing actuator; a first upper welding gun connected to the first moving block; and a first lower welding gun mounted to the fixing frame through a first lower welding gun body so as to correspond to the first upper welding gun.

The first pressing actuator may be configured as a roller screw actuator that converts rotational torque of an electric motor into linear motion.

The guide means may include: a guide rail mounted along the longitudinal direction of the guide plate; and a linear brake having one side slidably coupled to the guide rail, and the other side connected to each of the moving welding machines through a mounting plate, and configured to selectively limit a movement of each of the moving welding machines, which is slidingly moved together with the operating rod by the operation of the transfer cylinder, when a welding pitch is varied.

The linear brake may be electrically connected to a controller, and fixed on the guide rail by generating electromagnetic force in accordance with a control signal applied from the controller.

The moving welding machine may include: a moving frame slidably coupled to the operating rod and mounted on the mounting plate; a second pressing actuator including a screw shaft and mounted on the moving frame; a second moving block configured to be able to reciprocate at the screw shaft of the second pressing actuator; a second upper welding gun connected to the second moving block; and a second lower welding gun mounted to the moving frame through a second lower welding gun body so as to correspond to the second upper welding gun.

The second pressing actuator may be configured as a roller screw actuator that converts rotational torque of an electric motor into linear motion.

The one or more moving welding machines may include two moving welding machines that are provided at both sides of the fixed welding machine.

The spot welding apparatus may further include transformers mounted on the fixed welding machine and the respective moving welding machines for applying current to the fixed welding machine and the respective moving welding machines, respectively.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
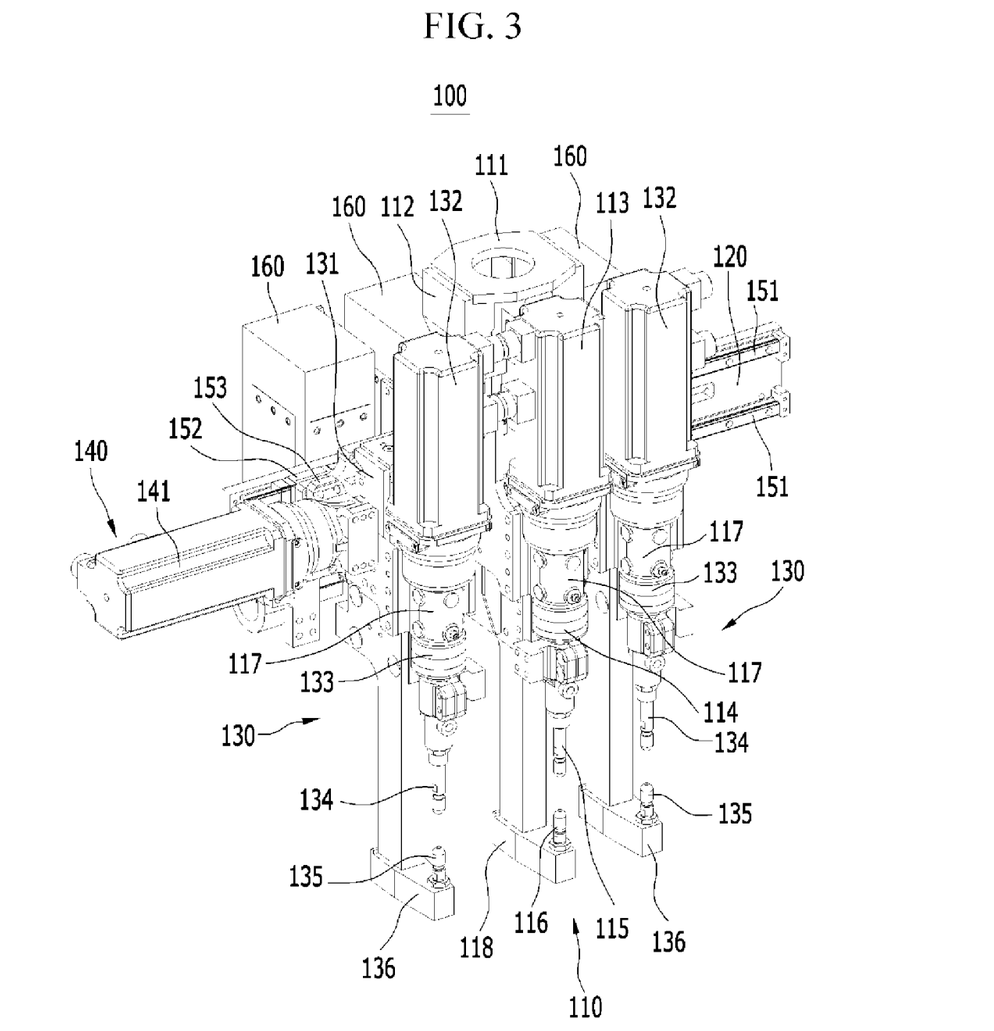
FIGS. 3 and 4 are perspective views illustrating an exemplary spot welding apparatus according to the present invention.
Figure 4:
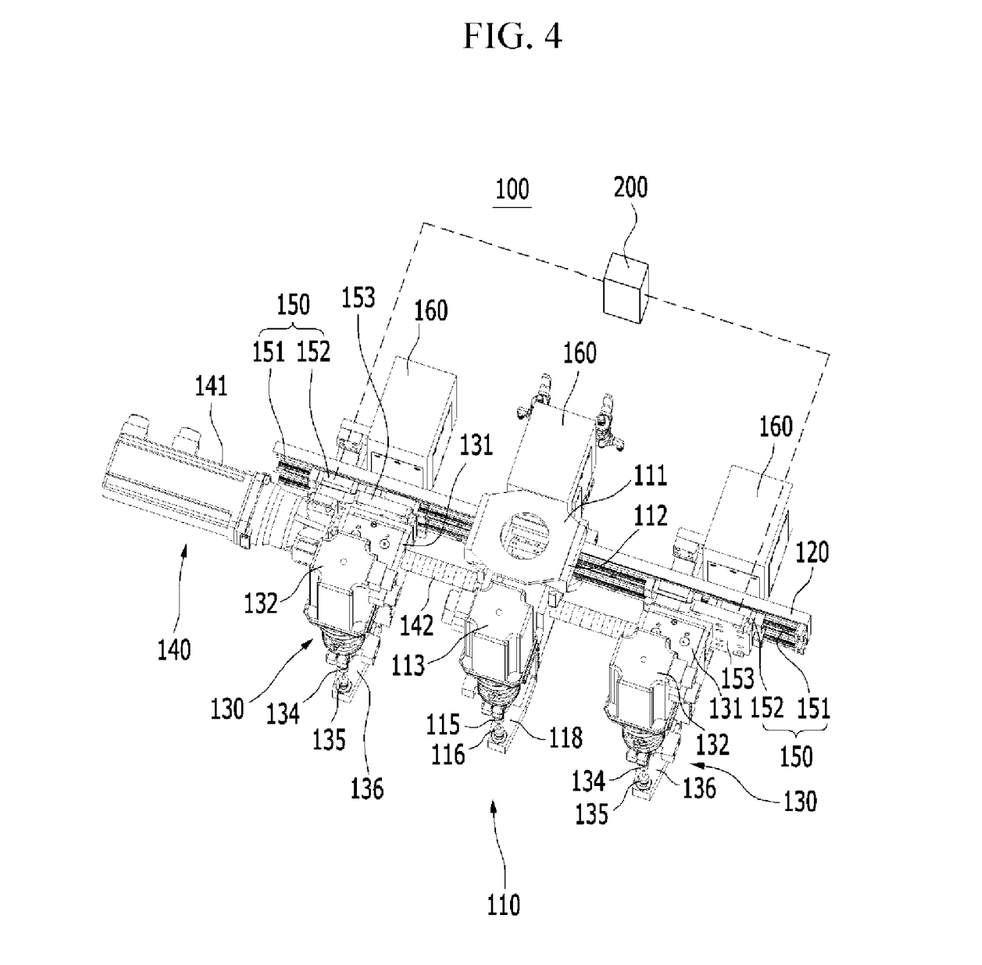

FIGS. 3 and 4 are perspective views illustrating a spot welding apparatus according to various embodiments of the present invention. Referring to the drawings, as illustrated in FIGS. 3 and 4, a spot welding apparatus 100 includes a fixed welding machine 110, a guide plate 120, and a moving welding machine 130.

First, the fixed welding machine 110 is coupled to a fixing frame 112, and a mounting portion 111, which is mounted on an arm of a robot, is formed on the fixing frame 112. The fixed welding machine 110 is positioned at a center of the guide plate 120, and the guide plate 120 is mounted on the fixing frame 112.

Further, the moving welding machine 130 is provided on the guide plate 120, and the moving welding machine 130 may be moved along the guide plate 120 by an operation of an operating unit 140. Further, one or more moving welding machine 130 is provided on the guide plate 120.

Meanwhile, while the drawings illustrate a configuration in which two moving welding machines 130 are provided with the fixed welding machine 110 interposed therebetween, but the present invention is not limited thereto. In the present detailed description, a configuration in which the two moving welding machines 130 are provided will be described for better understanding of the present invention.

Here, the operating unit 140 includes a transfer cylinder 141, an operating rod 142, and a guide means 150. The transfer cylinder 141 is mounted at one side of one moving welding machine 130 of the respective moving welding machines 130 (for example, a first or left moving welding machine 130). The operating rod 142 is connected to the transfer cylinder 141 and slidably coupled to the other moving welding machines 130 (for example, a second or right moving machine 130), and penetrates the fixed welding machine 110.

When the transfer cylinder 141 is operated, the operating rod 142 selectively and slidingly moves any one of the moving welding machines 130 along a longitudinal direction of the guide plate 120.

Further, the guide means 150 is provided between the guide plate 120 and each of the moving welding machines 130, and guides a movement of each of the moving welding machines 130. Here, the guide means 150 includes a guide rail 151, and a linear brake 152.

First, the guide rail 151 is mounted along the longitudinal direction of the guide plate 120. Further, one side of the linear brake 152 is slidably coupled to the guide rail 151, and the other side thereof is connected to each of the moving welding machines 130 through a mounting plate 153.

When a welding pitch is varied, the linear brake 152 selectively limits the movement of any one of the moving welding machines 130 that are slidingly moved on the operating rod 142 by an operation of the transfer cylinder 141. In addition, the linear brake 152 is electrically connected to a controller 200, and may be fixed on the guide rail 151 by generating magnetic force in accordance with a control signal applied from the controller.

Because general configuration and operation of the controller are known, a detailed description thereof will be omitted. Meanwhile, the aforementioned configuration of the fixed welding machine 110 will be described below in more detail.

In various embodiments, the fixed welding machine 110 includes a first pressing actuator 113, a first moving block 114, a first upper welding gun 115, and a first lower welding gun 116. The first pressing actuator 113 is mounted at one side of the fixing frame 112 through which the operating rod 142 penetrates. The first pressing actuator 113 may be configured as a roller screw actuator that converts rotational torque of an electric motor into linear motion. The first moving block 114 is configured to be able to reciprocate at a screw shaft 117 of the first pressing actuator 113. The first upper welding gun 115 is connected to the first moving block 114, and the first lower welding gun 116 is mounted to the fixing frame 112 through a first lower welding gun body 118 so as to correspond to the first upper welding gun 115.

In the fixed welding machine 110 configured as described above, when the first pressing actuator 113 is operated forward, the first moving block 114 moves the first upper welding gun 115 toward the first lower welding gun 116 while being moved forward along the screw shaft 117.

Accordingly, the first upper welding gun 115 and the first lower welding gun 116 press a welding point between panels to be welded, which are interposed between the first upper welding gun 115 and the first lower welding gun 116, and applies current to the panels, thereby performing the welding using resistance heat generated when the current is applied.

Further, the aforementioned configuration of the moving welding machine 130 will be described below in more detail.

In various embodiments, the moving welding machine 130 includes a moving frame 131, a second pressing actuator 132, a second moving block 133, a second upper welding gun 134, and a second lower welding gun 135. First, the moving frame 131 is screw-coupled to the operating rod 142, and mounted on the mounting plate 153. The second pressing actuator 132 includes a screw shaft 117, and is mounted at one side of the moving frame 131. Like the aforementioned the first pressing actuator 113, the second pressing actuator 132 may be configured as a roller screw actuator that converts rotational torque of an electric motor into linear motion.

In various embodiments, the second moving block 133 is configured to be able to reciprocate at the screw shaft 117 of the second pressing actuator 132. Further, the second upper welding gun 134 is connected to the second moving block 133, and the second lower welding gun 135 is mounted to the moving frame 131 through a second lower welding gun body 136 so as to correspond to the second upper welding gun 134.

In the moving welding machine 130 configured as described above, when the second pressing actuator 132 is operated forward, the second moving block 133 moves the second upper welding gun 134 of the moving welding machine 130 toward the second lower welding gun 135 while being moved forward along the screw shaft 117.

Accordingly, the second upper welding gun 134 and the second lower welding gun 135 press a welding point between panels to be welded, which are interposed between the second upper welding gun 134 and the second lower welding gun 135, and applies current to the panels, thereby performing the welding using resistance heat generated when the current is applied.

Meanwhile, in various embodiments, transformers 160, which apply current to the fixed welding machine 110 and the respective moving welding machines 130, are mounted on the fixed welding machine 110 and the respective moving welding machines 130 at the other side of the guide plate 120, respectively. That is, the transformers 160 supply current to the first and second upper welding guns 115 and 134 and the first and second lower welding guns 116 and 135 of the fixed welding machine 110 and the respective moving welding machines 130 so that the welding is performed.

Accordingly, spot welding is performed by resistance heat generated when the current is applied to the welding point of each of the panels and by welding force applied by the respective upper and lower welding guns.

Hereinafter, an operation of the spot welding apparatus 100 according to various embodiments of the present invention, which is configured as described above, will be described.

Figure 5:
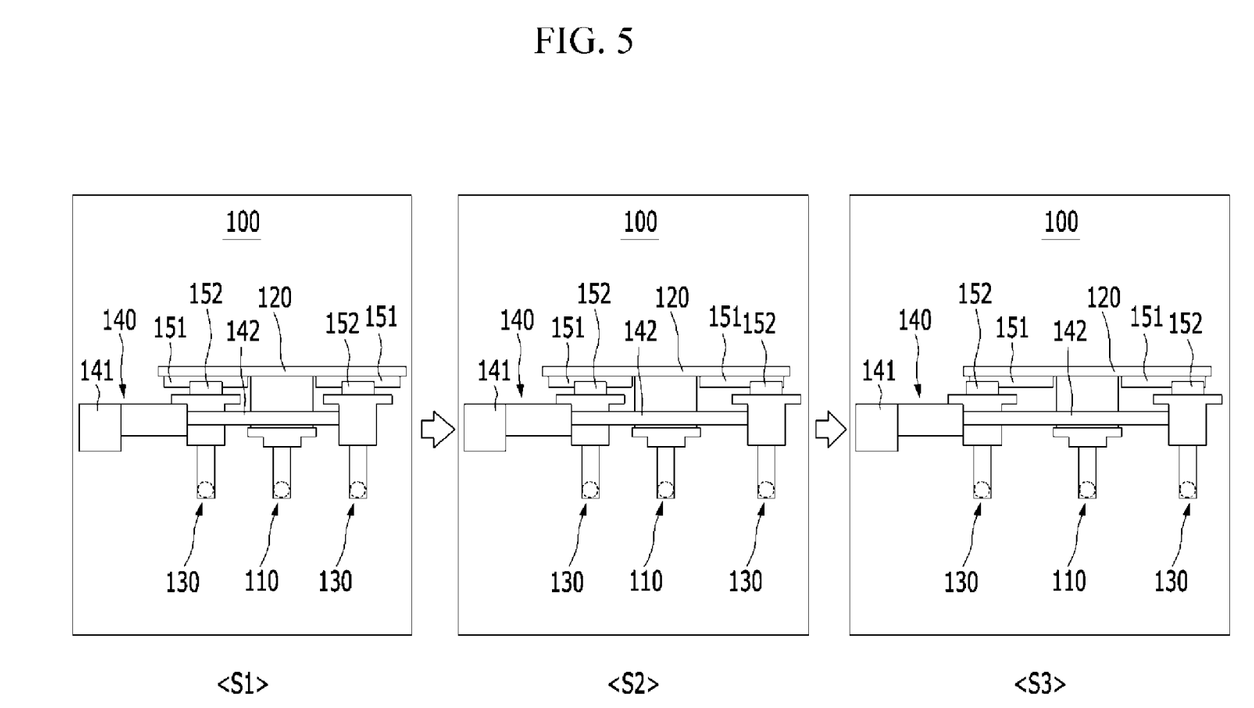
FIG. 5 is an operational state view illustrating an operational state of an exemplary spot welding apparatus according to the present invention.

FIG. 5 is an operational state view illustrating an operational state of the spot welding apparatus according to various embodiments of the present invention. First, as indicated by S1 of FIG. 5, in the spot welding apparatus 100, in a case in which the pitch of the welding points is uniform or substantially uniform with an equal interval, the respective moving welding machines 130 are positioned to be spaced from each other with the fixed welding machine 110 interposed therebetween by the same or substantially the same distance so as to correspond to the pitch of the welding points.

In this state, as indicated by S2 of FIG. 5, in a case in which the pitch of the welding points is varied such that the moving welding machine 130 positioned at an opposite side to the transfer cylinder 141 is moved, the movement of the moving welding machine 130 on which the transfer cylinder 141 is mounted is stopped on the guide rail 151 as the linear brake 152 is operated.

In this case, when the transfer cylinder 141 is operated, a state in which the movement of the moving welding machine 130 connected to the transfer cylinder 141 is stopped by the linear brake 152 is maintained, and by an operation of the transfer cylinder 141, the moving welding machine 130 disposed at the right side of the drawing is pushed by the operating rod 142 and slidingly moved along the guide rail 151 toward the opposite side to the fixed welding machine 110.

That is, even though the transfer cylinder 141 is operated, the moving welding machine 130, which is braked by the linear brake 152, maintains the current position thereof, and the moving welding machine 130, which is not braked by the linear brake 152, is moved by the operation of the transfer cylinder 141.

Accordingly, a welding point pitch distance between the fixed welding machine 110 and the moving welding machine 130 disposed at the right side of the drawing is more increased than a welding point pitch distance between the moving welding machine 130 disposed at the left side of the drawing and the fixed welding machine 110.

Meanwhile, in the aforementioned state, in a case in which the pitch of the welding points of the moving welding machine 130 to which the transfer cylinder 141 is connected, that is, the moving welding machine 130 disposed at the left side of the drawing is required to be increased, in contrast with the aforementioned description, the linear brake 152 of the moving welding machine 130 disposed at the right side of the drawing is operated to prevent the moving welding machine 130 disposed at the right side of the drawing from being moved.

The linear brake 152 (the first or the left linear brake 152) of the moving welding machine 130 to which the transfer cylinder 141 is connected is not operated. Then the transfer cylinder 141 pushes the operating rod 142 connected to the second or the right moving welding machine 130, and then the first or the left moving welding machine 130 disposed at the left side of the drawing moves along the guide rail 151 toward the left side. That is, the distance between the moving welding machine 130 disposed at the left side of the drawing and the fixed welding machine 110 is increased.

An inverse operation is required when the pitch distance between the moving welding machine 130 and the fixed welding machine 110 is decreased, and a repeated description thereof will be omitted.

In the respective moving welding machines 130, when the pitch of the welding points is varied on the basis of the fixed welding machine 110, the respective moving welding machines 130 are simultaneously or cooperatively moved or reciprocate one by one by the selective operation of the respective linear brakes 152 along the guide rail 151 in the longitudinal direction of the guide plate 120, thereby increasing or decreasing the pitch of the welding points.

Therefore, when the spot welding apparatus 100 according to various embodiments of the present invention is applied, the two or more moving welding machines 130, which independently perform the spot welding, are configured to be variably movable on the basis of the fixed welding machine 110 such that the welding pitch may be selectively adjusted so as to correspond to positions and distances of the welding points when the welding work is performed, thereby quickly performing the welding work in a limited space for a minimum period of time.

In addition, the welding work is possible using a single apparatus with three times in maximum or higher efficiency than the related art, thereby improving productivity, flexibility, and efficiency of a vehicle body process, reducing installation costs by applying a single apparatus and reducing the number of robots, and reducing energy consumption.

In addition, the spot welding apparatus is configured to be able to adjust the welding pitch in real time so as to correspond to the position of the welding point and the shape of the panel, thereby enabling the continuous and efficient welding work without a shutdown that is required to set an apparatus in accordance with adjustment of the welding pitch.

For convenience in explanation and accurate definition in the appended claims, the terms "upper" or "lower", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A spot welding apparatus comprising:
    a fixed welding machine coupled to a fixing frame having a mounting portion mounted on an arm of a robot;
    a guide plate mounted on the fixing frame;
    more than one moving welding machines mounted to be selectively and slidingly movable along a longitudinal direction of the guide plate; and
    an operating unit configured to selectively move the more than one moving welding machines,
    wherein the operating unit includes:
        a transfer cylinder mounted at one side of any one moving welding machine of the more than one moving welding machines;
        an operating rod penetrating the fixing frame, slidably connected to the moving welding machine, which selectively and slidingly moves the moving welding machine by operating the transfer cylinder; and
        a guide means provided between the guide plate and each of the than one moving welding machines to guide movement of each of the more than one moving welding machines,
    wherein the guide means includes:
        a guide rail mounted on the guide plate along the longitudinal direction of the guide plate; and
        a linear brake having a first side slidably coupled to the guide rail, and a second side connected to each of the more than one moving welding machines through a mounting plate,
    wherein at least one of the more than one moving welding machines is connected to the transfer cylinder and at least one of the more than one moving welding machines is configured to be selectively coupled to the operating rod, wherein the operating rod mounted to and relatively movable with respect to the transfer cylinder is moved by the operation of the transfer cylinder so as to adjust a distance between the fixed welding machine and the at least one of the more than one moving welding machines configured to be selectively coupled to the operating rod, when a welding pitch of an object for spot welding is varied, and
    wherein the linear brake is electrically connected to a controller, and connected with the guide rail by electromagnetic force in accordance with a control signal applied from the controller.

2. The spot welding apparatus of claim 1, wherein the fixed welding machine includes:
    a first pressing actuator mounted on the fixing frame through which the operating rod penetrates;
    a first moving block configured to be able to reciprocate at a screw shaft of the first pressing actuator;
    a first upper welding gun connected to the first moving block; and
    a first lower welding gun mounted to the fixing frame through a first lower welding gun body so as to correspond to the first upper welding gun.

3. The spot welding apparatus of claim 2, wherein the first pressing actuator is configured as a roller screw actuator that converts rotational torque of an electric motor into linear motion.

4. The spot welding apparatus of claim 1, wherein the moving welding machine includes:
    a moving frame slidably coupled to the operating rod and mounted on the mounting plate;
    a second pressing actuator including a screw shaft and mounted on the moving frame;
    a second moving block configured to be able to reciprocate at the screw shaft of the second pressing actuator;
    a second upper welding gun connected to the second moving block; and
    a second lower welding gun mounted to the moving frame through a second lower welding gun body so as to correspond to the second upper welding gun.

5. The spot welding apparatus of claim 4, wherein the second pressing actuator is configured as a roller screw actuator that converts rotational torque of an electric motor into linear motion.

6. The spot welding apparatus of claim 1, wherein the more one moving welding machines includes two moving welding machines that are provided at both sides of the fixed welding machine.

7. The spot welding apparatus of claim 1, further comprising:
   a plurality of transformers mounted on the fixed welding machine and respective moving welding machine for applying current to the fixed welding machine and the respective moving welding machine, respectively.

* * * * *